United States Patent [19]

Hegler et al.

[11] 4,158,534

[45] Jun. 19, 1979

[54] APPARATUS FOR CUTTING OPENINGS AT ARBITRARILY SELECTABLE INTERVALS INTO PIPES

[75] Inventors: Wilhelm Hegler, Goethe Str. 2, 873 Bad Kissingen, Fed. Rep. of Germany; Ralph P. Hegler, Bad Kissingen, Fed. Rep. of Germany

[73] Assignee: Wilhelm Hegler, Bad Kissingen, Fed. Rep. of Germany

[21] Appl. No.: 761,174

[22] Filed: Jan. 21, 1977

[30] Foreign Application Priority Data

Jul. 3, 1976 [DE] Fed. Rep. of Germany ....... 2630078

[51] Int. Cl.² .............................................. B29C 17/14
[52] U.S. Cl. .................................... 425/142; 425/290; 425/317; 83/54
[58] Field of Search ..................... 83/54, 332; 425/142, 425/290, 317

[56] References Cited

U.S. PATENT DOCUMENTS

| | | | |
|---|---|---|---|
| 3,819,778 | 6/1974 | Maroschak | 425/142 X |
| 3,910,713 | 10/1975 | Maroschak | 425/290 X |
| 3,990,827 | 11/1976 | Maroschak | 425/142 X |

Primary Examiner—Robert L. Spicer, Jr.
Attorney, Agent, or Firm—Sprung, Felfe, Horn, Lynch & Kramer

[57] ABSTRACT

An apparatus for cutting openings at arbitrarily selectable intervals into a pipe which has a smooth inside or outside surface or a transversely corrugated inside or outside surface comprising a knife disposed inside or outside said pipe, and a movable element whose movement is responsive to a signal to move the knife and pipe wall into mutual contact so that the knife cuts into the pipe wall. Disclosed herein is an apparatus which cuts an opening through the surface of a smooth inner pipe disposed within an outer pipe having transverse corrugations. Also disclosed is an apparatus whose knife is disposed exteriorly and is employed to cut openings into the exteriorly disposed transversely corrugated pipe. The application further discloses an apparatus comprising a pipe forming machine, an apparatus which cuts a hole in a pipe from within the pipe and an apparatus which cuts a hole in a pipe from outside the pipe.

16 Claims, 11 Drawing Figures

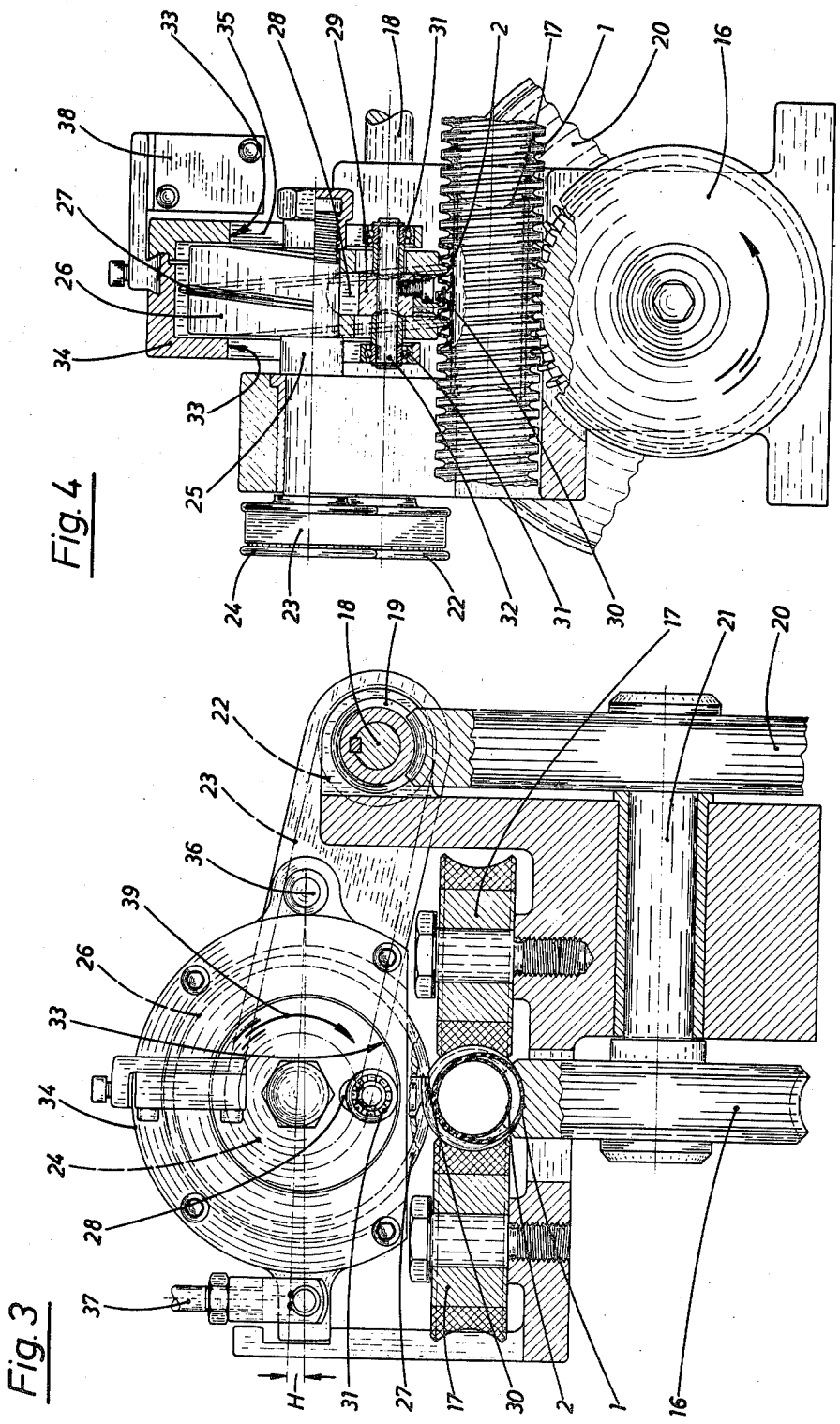

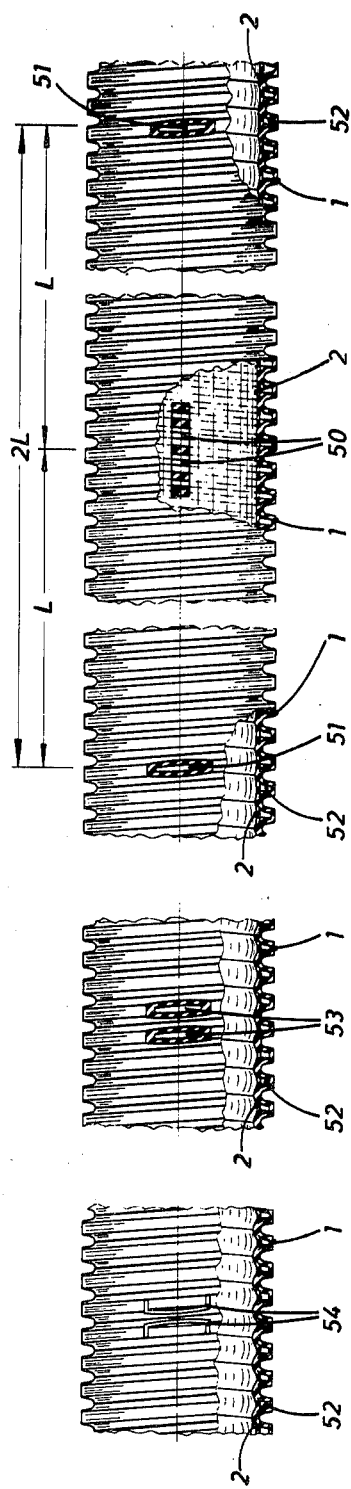
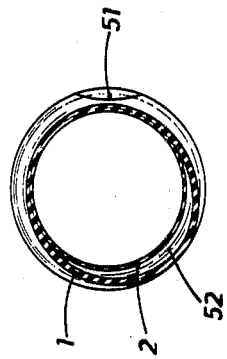
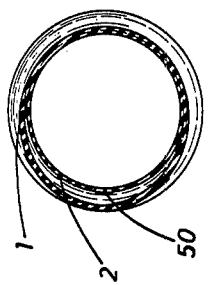

APPARATUS FOR CUTTING OPENINGS AT ARBITRARILY SELECTABLE INTERVALS INTO PIPES

BACKGROUND OF THE INVENTION

1. Field of the Invention

This invention relates to an apparatus for cutting openings of arbitrarily selectable intervals into pipes that are smooth inside and/or outside or transversely corrugated inside and/or outside. This invention also relates to a trickle irrigation pipe comprising an outer tube whose wall is transversely corrugated and an inner tube having a plain, smooth surface, said inner tube containing water transfer openings, said outer tube having water exit openings which are relatively displaced in relation to the water transfer openings.

2. Discussion of the Prior Art

It has been the practice for a long time to use synthetic plastic pipes for purposes of irrigation and drainage. This requires openings to be subsequently cut into pipes that have been produced in a pipe forming machine. A fair number of arrangements have been proposed for sawing, punching, or cutting openings into such pipes at consecutive, equidistant intervals. For instance, pipes provided with transverse corrugations can be provided from the outside or inside with saw or knife cuts to produce a water inlet or exit opening in each crest or valley of the corrugation. It has also been proposed to produce boss-like elevations in the valley bottoms during the forming process and later to shave off these bosses with a knife moving along the valleys. In such apparatus it is in fact possible by suitably disposing the bosses to produce openings at major intervals. However, the intervals are determined in the forming machine and they cannot be arbitrarily varied.

Particular difficulties arise in the production of pipes intended for trickle irrigation. Trickle irrigation pipes are required to contain water exit openings at intervals of about 0.5 to 2 meters, but the water must not issue from these openings in the form of jets, instead it must trickle out in driblets. Since appropriately small nozzles fitted into the pipe wall are liable to become blocked, it has been proposed to throttle the exit of the water by forcing it to pass through an elongated passage on its way from the inside of the pipe to the outside. The cross section of such a passage should be only a few square millimeters and its length several meters to create a high resistance to flow.

A known method of producing such long narrow channels is to enclose a helically corrugated tube in a smooth outer tube, the corrugated inner tube being provided at intervals with openings through which the water can pass from the inside of the inner tube into the channels formed between the transverse corrugations of the inner tube and the smooth outer tube, the latter at intervals containing exit openings through which the water can dribble out after having passed through a lengthy helical passage. However, difficulties arise in the production of such trickle irrigation pipes because either the transversely corrugated tube must be provided with openings before the outer tube is extruded around it, openings being then cut into the outer tube, an overall procedure which comprises several operations, or apparatus for cutting openings on the one hand into the inner tube from the inside and on the other hand into the outer tube from the outside must be provided. However, such an apparatus must not then continuously cut these openings like conventional equipment, as it is required to cut them at arbitrarily adjustable intervals. This requirement necessitates operating the cutters at controllable intervals of time.

SUMMARY OF THE INVENTION

Broadly this invention contemplates an apparatus for cutting openings at arbitrarily selectable intervals into a pipe which has a smooth inside or outside surface or transversely corrugated inside or outside surface comprising a knife disposed inside or outside said pipe, and a movable element whose movement is responsive to a signal to move the knife and pipe wall into mutual contact so that the knife cuts into the pipe wall.

This invention furtherr contemplates a trickle irrigation pipe comprising an outer tube whose wall is transversely corrugated and an inner tube having a plain, smooth surface, said inner tube containing water transfer openings, said outer tube having water exit openings which are displaced in relation to the water transfer openings.

The problems attendant the prior art approaches are solved according to the invention in that an apparatus which arbitrarily cuts water entry or exit openings at selectable adjustable intervals into pipes is provided. The apparatus is especially useful in connection with pipes having a smooth inside or outside surface or a transversely corrugated inside or outside surface. It is especially useful in connection with pipes having an inner and an outer tube, the inner tube being of plain, smooth construction and the outer tube having transverse corrugations. In such a pipe the inner tube abuts the valleys of the transverse corrugations of the outer tube.

The apparatus is characterized by a movable element whose movement is initiated by a signal to move the knife and pipe wall into mutual contact so that the knife cuts into the pipe wall.

An apparatus is provided in which the knife is located inside the pipe to cut into the pipe from the inside, the pipe travelling with clearance over a mandrel and being externally supported by a movable element in the form of a carrier means which displaces the pipe into contact with the knife in the mandrel for cutting the opening. However, if the knife is located outside the pipe, then the pipe may traverse a cylinder which revolves about an axis parallel to the pipe axis, and which is fitted with a radially movable knife held in a holder that can be advanced towards the pipe. Furthermore, if the apparatus is intended to cut the water openings into a trickle irrigation pipe consisting of a transversely corrugated tube and a smooth inner or outer tube, then apparatus for cutting the openings from the inside and apparatus for cutting the openings from the outside may be consecutively located so that there is an adjustably controllable distance between them in the direction of travel of the pipe, and they are synchronously driven.

In the first type of apparatus in which the knife is inside the pipe the carrier means can comprise a thrust roller for pressing the pipe against the knife and a counter-roller which is movable in the transverse direction jointly with the thrust roller. Alternatively the inside mandrel may be disposed so that it floats and can be displaced crosswise of its longitudinal axis, the carrier means consisting of guide rollers which are mounted in a carrier frame that is displaceable crosswise of the direction of motion of the pipe, and which by their crosswise displacement displace the inside mandrel together with the knife against the pipe which is supported by a roller.

In apparatus in which the knife is outside the pipe, the movable element can be a circular casing which is tiltable about a hinge towards the cylinder wherein the knife is radially movable, and which guides the knife with its inner edge. In such an arrangement the knife in inoperative position will be guided along a path which is concentric with the cylinder, and which is entirely inside the cylinder, so that it cannot move into cutting position, whereas after the casing has been deflected the knife will travel on a path which is eccentric in relation to the cylinder and enables it to cut an opening or openings into the pipe. Since the tilting deflection of the movable element must take place when the cylinder is in a position in which the knife is still inoperative, the casing preferably contains an adjustable approach switch operable by the knife or a part connected to the knife. If the openings are to be cut into a pipe which is externally corrugated the cylinder will preferably be a cylinder cam having a peripheral cam which is suitably pitched, and which revolves at an appropriate speed for the axial feed rate generated by the cam to equal the linear speed of the pipe. If the corrugations are helical the pitch of the cam may with advantage correspond to the pitch of the helical corrugations.

In order to prevent the pipe from yielding to the pressure of the knife edge a roller facing the rotating cylinder may be provided for supporting the diametrically opposite side of the pipe, and, additionally, guide rollers may also be disposed on both sides of the pipe.

If the openings are to be cut into a pipe having transverse external corrugations at least one of the rollers may be provided with gear teeth adapted to mesh with the transverse corrugations of the pipe, and the roller may be drivable in synchronism with the forming machine which produces the transversely corrugated pipe. If the two cutting machines for cutting the water openings into a pipe for trickle irrigation are consecutively disposed in the direction of motion of the pipe, then it will be advantageous to connect the two cutting machines to the forming machine which forms the transverse corrugations, by providing a longitudinally slotted drive shaft for driving the driven elements of both cutting machines, i.e. more particularly the guide rollers and the cylinder in which a knife is radially displaceable. The signal for initiating the cutting operations is then conveniently generated in the forming machine.

The invention also relates to a trickle irrigation pipe produced with the aid of apparatus of the described kind and consisting of an outer tube having a wall which is helically corrugated and of an inner tube having a plain smooth and thin wall, the inner tube containing water transfer openings and the outer tube water exit openings which are displaced in relation to the water transfer openings. In such a pipe two water exit openings forming a pair may be located side-by-side and they may be cut into the flanks of the crests of the transverse corrugations of the pipe.

BRIEF DESCRIPTION OF DRAWINGS

Embodiments of apparatus and of irrigation pipes according to the invention are illustrated in the drawings in which

FIGS. 3 and 4 are a front end view and a section of apparatus for cutting water exit openings into a pipe from the outside;

FIGS. 6 to 11 are side views partly broken open or in part section, and cross sections of irrigation pipes with openings cut into the same.

Figure 1:
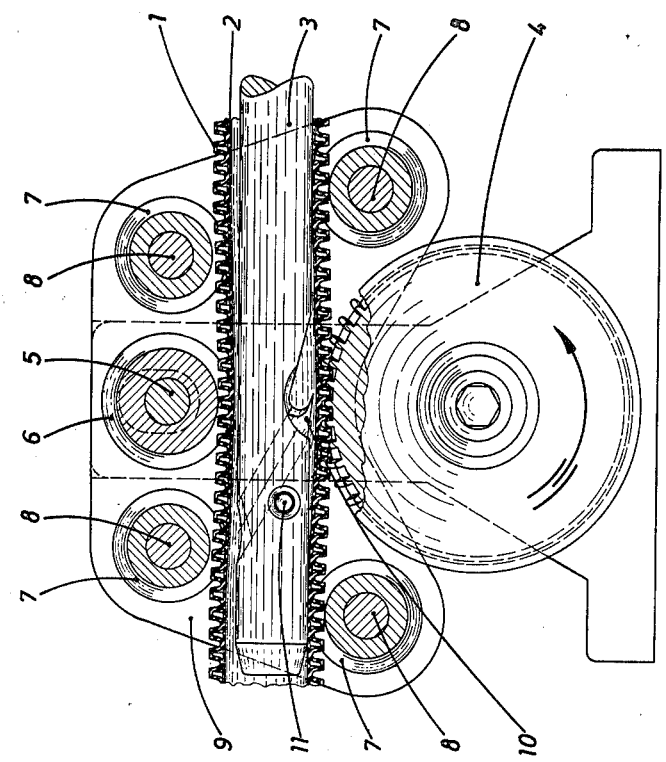
FIGS. 1 and 2 are side views of apparatus in different positions for cutting water exit openings into a pipe from the inside.
Figure 2:
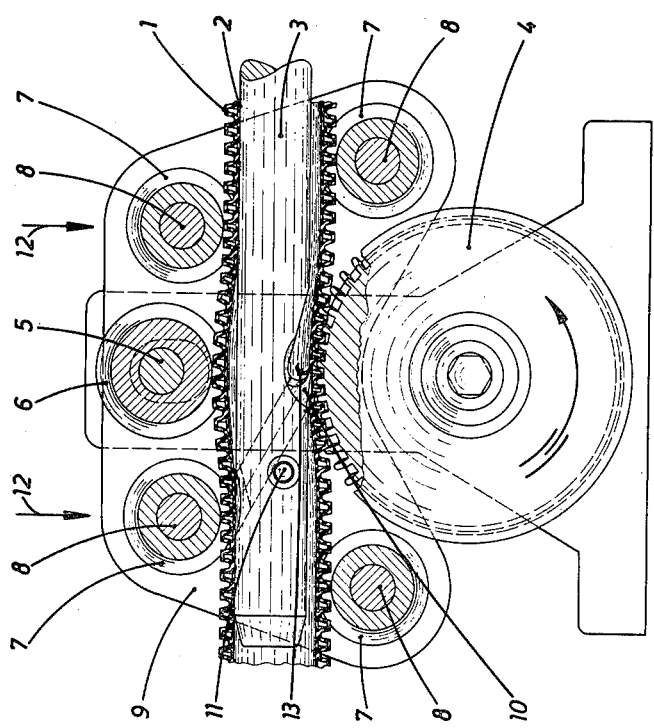

Referring to the apparatus shown in FIGS. 1 and 2, the pipe consisting of an outer tube 1 provided with helical corrugations and a smooth inner tube 2 travels from right to left over a floating mandrel 3 which is attached to the inner mandrel of a preceding pipe forming machine in a manner affording limited freedom of movement in a direction transversely to its axis in the plane of the drawing. The internal diameter of the pipe exceeds the external diameter of the mandrel by a sufficient margin to provide the required clearance between the two. The pipe travels in fixed guide means comprising a roller 4 revolving synchronously with the pipe forming machine and an idling counter-roller 6 which is rotatable about an axle pin 5. Roller 4 is provided with teeth which mesh with the transverse corrugations in the pipe 1. The pipe 1 is also located by four idling rollers 7 which are rotatable about axle pins 8 in a carrier frame 9 which is capable of being displaced in the vertical. All of the rollers may be mounted on ball bearings to ensure a smooth and easy action.

In position of rest of the carrier frame, and as illustrated in FIG. 1, the pipe 1 and the mandrel 3 inside are slightly raised between the backup rollers 4 and 6. Hence, the pipe slightly sags in the downward direction, the clearance provided between mandrel and pipe preventing the pipe from coming into contact with a knife at 10. This knife 10 is affixed to the mandrel 3 by a clamping screw 11.

When it is desired to cut an opening into the pipe a signal preferably emanating from the pipe forming machine causes the carrier frame 9, as shown in FIG. 2 and indicated by arrows 12 to be slightly lowered. The rollers 7 force the pipe 1 as well as the mandrel 3 downwards. However, since the rollers 4 and 6 do not participate in this movement, the pipe 1 is forced slightly to arch upwards and roller 4 pushes the inside of the pipe against the knife 10 which therefore cuts a chip 13 out of the inside of the pipe.

The downward displacement of the carrier frame 9 and hence of the mandrel 3 can be adjustably so controlled that even though the smooth inner tube 2 may have a very thin wall, only the inside wall is slit and the knife does not also cut into the valley bottoms of the transverse corrugations of the substantially thicker outer tube 1.

When handling pipes in which the thickness of the inner tube 2 is no more than that of a foil, i.e. between 0.1 and 0.2 mm, it is advisable, with a view to ensuring that the inner tube is cut, to preadjust the displacement of the carrier frame 9 in such a way that a very small sliver is also cut out of the outer tube though not enough to cut completely through the thickness of the outer tube wall. The arrangement is also suitable for cutting openings into the valleys of a transversely corrugated or smooth pipe or into a transversely corrugated tube which is embraced by an outer tube. However, in such a case the displacement of the carrier frame 9 must be controllably preadjusted in such a way that the knife 10 cannot foul the teeth.

In the arrangement illustrated in FIGS. 3 and 4 the pipe which again comprises an external transversely corrugated tube 1 and an inner smooth tube 2 is supported by a geared roller 16 and two idling rollers 17, one on each side of the pipe. The purpose of these rollers 17 is to resist the effect of tangential forces which arise when the openings are cut and which seek to turn the pipe, and they are therefore preferably provided with a rubber or like coating. The apparatus driven by a shaft 18 which on the one hand through a worm 19, a worhwheel 20, and a shaft 21 drives roller 16, and on the other hand, through a gear 22 and a toothed belt 23, drives a gearwheel 24 which in turn drives a flat cylinder 26 on a shaft 25. Shaft 18 can be longitudinally slotted for the reception of a key in the worm 19 to permit the entire arrangement to be moved axially along the length of the shaft 18. The cylinder 26 is provided with a helical cam 27 embracing its periphery. This cam 27 engages the valleys of the corrugations of tube 1. The transmission ratio to and the radius of the cylinder 26 are so chosen that the linear feed of the tube 1 to the roller 16 corresponds to the feed rate that would be imparted to the tube by the cam 27. Moreover, the radius of the cylinder 26 is chosen by reference to the radius of the tube 1 in such a way that the angular pitch of the cam 27 corresponds to the angular pitch of the helical corrugations. In the illustrated embodiment the linear pitch of the helical cam 27 is three times that of the linear pitch of the helical corrugations of the tube 1 so that the diameter over the flanks of the cam 27 is also three times the overall diameter of tube 1, and assuming that the corrugations of the tube 1 define a right hand screw, the cam 27 will define a left hand screw. This will ensure that the angular pitch of the two screws is the same. The rollers 17 and the shafts 21 and 25 will likewise be arranged to rotate on ball bearings to ensure easy and smooth running.

A radial recess 28 in cylinder 26 contains a knife holder 29 (FIG. 4) for a knife 30. The knife holder 29 is located by rollers 31 which are mounted on a short shaft 32 with the interposition of ball bearings. These rollers 31 run on the inside of the circular recess 35 in a casing 34. The casing 34 is hingeably mounted on a pin 36 and can be tiltably raised and lowered through a limited angle H by means of a rod 37 coupled to a short-stroke actuator cylinder not shown in the drawing.

When the casing 34 is in its raised position its inside edge 33 concentrically surrounds the shaft 25 of cylinder 26, the knife holder 29 being so held that the knife does not project from the cylinder 26. However, when the casing 34 is lowered into the position shown in FIG. 3, then the edge 33 will be eccentric in relation to the cylinder 26 and the knife holder will be advanced until the knife projects from the peripheral surface of cylinder 26 when it is in its bottom dead center position shown in FIG. 3.

When a command signal S is received which causes the casing 34 to be lowered by the short-stroke actuator cylinder into its bottom position, then the knife therefore cuts an opening into the tube 1. In order to provide a control which ensures that the knife 30 always returns into the concentric path when it is not in cutting position, the casing 34 contains an adjustable approach switch 38 which responds when the end of shaft 32 which slightly projects from the casing passes the switch 38. The arrangement will therefore function as follows:

When a control signal from the tube forming machine is received indicating that an opening is to be cut, the short-stroke actuator cylinder will not immediately respond, since the first result of the signal is the activation of the approach switch 38. As soon as the end of shaft 32 passes the approach switch, i.e. in the illustrated embodiment when the knife is in its upper position, the short-stroke actuator cylinder will be operated and the casing 34 lowered into the position according to FIG. 3. Owing to the centrifugal forces the rollers 31 always remain in contact with the inside edge of recess 35 of the casing and in the course of the continued revolution of the plate 26 in the direction of arrow 39 the knife 30 will move outwards into cutting position as shown in the drawings to cut into the external corrugations in tube 1. Since after having effected the cut the knife returns into its upper position the casing 26 being raised through angle H, the knife 30 will again be inside the cylinder 26. According to the width of the knife 30, openings can be cut into only one corrugation or into two or three consecutive corrugations.

Figure 5:
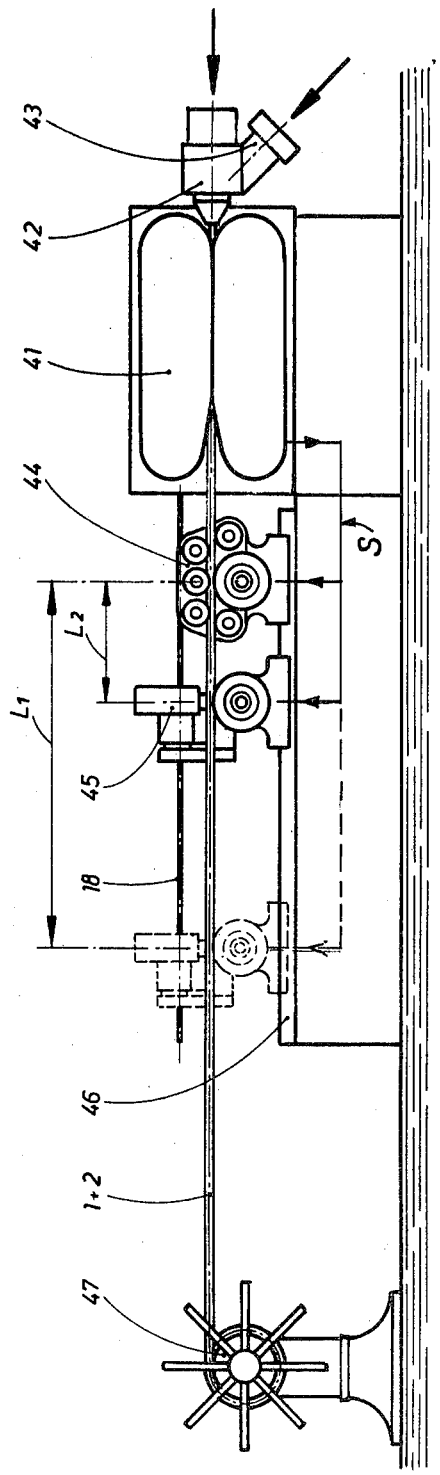
FIG. 5 is an overall diagram of a pipe forming machine associated with cutting apparatus for cutting openings into the pipe from the inside and from the outside.

FIG. 5 is a general view of the overall arrangement for cutting openings into trickle irrigation pipes. The tube forming machine 41, as is diagrammatically indicated, comprises, as is conventional, two tracks for two sets of articulated recirculating molds which combine to form a tubular mold cavity extending from right to left in the drawing. Ring nozzles 42,43 extrude two concentric tubes into this tubular cavity, the external tube being provided with transverse corrugations by exhaustion of the air from the inside of the mold, whereas the inner tube is extruded against the inside surface of the outer tube after this has been shaped. The compound tube leaves the mold cavity and enters a first cutting machine 44 which corresponds to the apparatus above described with reference to FIGS. 1 and 2, and which cuts openings into the inner tube. The tube then enters the second cutting machine 45 which corresponds to the apparatus above described with reference to FIGS. 3 and 4, and which cuts openings into the crests of the corrugations of the outer tube. Both these latter machines are longitudinally movable on a machine bed 46, and they are driven by a shaft 18 in synchronism with the forming machine 41. The finished tube containing the openings that have been cut into the same is then coiled up in conventional manner on a reel 47.

It will be understood from FIG. 5 that the distance between the two cutting machines can be varied from a minimum distance $L_2$ to a maximum distance $L_1$. In pipes intended for trickle irrigation the water exit openings in the outer tube should normally be situated midway between two water transfer openings in the inner tube. In order to achieve this result it is assumed that the two cutting machines receive the signal for cutting the openings at the same time, and the distance L between the two cutting machines equals half the distance between consecutive outer and inner water openings. The signal for cutting the openings should preferably be generated by the pipe forming machine, for which purpose it will merely be necessary to locate appropriate devices along the track of the molds for generating the signal. Since the position of such devices along the track of the mold can easily be varied and the distance between the two cutting machines can be easily appropriately adjusted, one can in one and the same apparatus produce pipes in which the spacing of the openings varies within fairly wide limits, for instance between 0.5 and 2 meters. For example, if the openings are spaced 1 meter apart, then the distance must be adjusted to 0.5 meters.

FIG. 6 is an illustration of a section of a trickle irrigation pipe, partly broken open, which has been produced in plant of the kind illustrated in FIG. 5. The window broken into the section in the middle reveals the water transfer openings 50 which have been cut into the inner tube 2 by a cutting machine such as that shown in FIGS. 1 and 2. The windows broken into the two sections on either side reveal the water exit openings 51 which have been cut into the crests of the corrugations of the outer tube by the cutting machine illustrated in FIGS. 3 and 4. If the wall of the inner tube 2 is very thin, for example about 0.1 to 0.2 mm, and this tube consists of an elastic material, then the special advantage will be secured that the cross section of flow of the channel 52 defined by the corrugations of the outer tube will depend upon the pressure differential between the inside of the inner tube and inside the channel 52. Near the water transfer openings 50 the pressures are still practically equal. The inner wall 2, as illustrated in the central section, is still quite smooth. But near the water exit openings 51 the pressure in channel 52 will have dropped considerably. The pressure differential here will be fairly high and the internal pressure will push the inner tube 2 into the corrugations of the outer tube, thereby reducing the cross section of flow provided by channel 52. If the trickle irrigation pipe is of considerable length so that the pressure inside the pipe drops significantly, then this pressure differential will also become less restricted.

This ensures that irrespectively of the pressure drop along the length of the pipe water will dribble from all the water exit openings 51 at practically the same rate. In conventional irrigation pipes in which an inner transversely corrugated tube is enveloped by a smooth outer tube this effect cannot occur, because the thick-walled inner tube is not deformed by the pressure differential. In view of the restricted flow channels from the water transfer openings to the water exit openings there is always the risk of the channels becoming blocked, either by lime contained in the water or other salts, such as iron salts, which form deposits, or because fertilisers and growth regulators have been added to the water. If these deposits become dry during lengthy storage of the pipe, they tend to embrittle and provided the inner tube is thin, they may flake off when the pipe is flexed so that they can be flushed out. The distance 2L between two consecutive water exit opneings is twice that of the distance L between the two cutting machines in FIG. 5.

FIG. 7 is a cross section of the pipe in FIG. 6, taken where the water transfer openings 50 are located, whereas FIG. 8 is a section in the plane of a water exit opening 51.

Sometimes, particularly when the distances between the water exit openings are long, it may be advisable, as shown in FIG. 9, to cut two water exit openings 53 into the crests of neighboring corrugations. In order that this may be done it is merely necessary for the knife 30 in the cutting machine according to FIGS. 3 and 4 to be made sufficiently wide. The two water exit openings can be supplied with water from both sides, i.e. by neighboring water transfer openings 50 located on either side.

Alternatively the knife 30 may be so contrived that it will cut openings into the flanks of the crests of the corrugations, as shown in FIGS. 10 and 11. This has the advantage that when such a pipe is laid and dragged over the ground the water exit openings will not be so easily blocked with wet soil. Compared with pipes in which the transversely corrugated tube is the inner tube and the smooth tube the outer tube, and which can also be provided with openings by a machine such as that shown in FIG. 5, the irrigation pipe illustrated in FIGS. 6-11 has the advantage that the inner tube which is protected against possible damage may be very thin walled, thus saving a considerable amount of material.

We claim:

1. An apparatus for cutting openings at aribtrarily selectable intervals into a pipe which has an inside and outside surface comprising a knife and a movable element whose movement is responsive to a signal to move the knife and pipe wall into mutual contact and against a backup means so that the knife cuts into the pipe wall.

2. An apparatus according to claim 1 wherein said apparatus further comprises a mandrel disposed within said pipe with clearance between the inner walls of said pipe and said mandrel, said mandrel carrying said knife within said pipe, said pipe supported by said movable element which is in the form of a carrier means which carrier means holds said pipe while displacing a portion of it so as it contacts the inner walls of said pipe with said knife.

3. An apparatus according to claim 1 wherein said apparatus further comprises a cylinder disposed exteriorly of said pipe which revolves about an axis, parallel to said pipe axis, said cylinder carring a radially movable knife held in a holder and means for advancing said knife towards said pipe.

4. An apparatus according to claim 2 having disposed in the path of travel of said pipe a second opening cutting tool which opening cutting tool comprises a cylinder disposed exteriorly of said pipe which revolves about an axis parallel to said pipe axis, said cylinder carrying a radially movable knife held in a holder and means for advancing said knife towards said pipe; said apparatus having the internally disposed mandrel being synchronously driven with said apparatus having the exteriorly disposed cylinder.

5. An apparatus according to claim 2 wherein said carrier means comprises a thrust roller for urging said pipe against said knife and a counter-roller disposed on the opposed side of said pipe from said thrust roller, said thrust roller and said counter-roller being movable in the transverse direction jointly.

6. An apparatus according to claim 2 wherein said mandrel is displaceable transversely of the longitudinal axis of said pipe, said pipe exteriorly supported by a thrust roller and said carrier means comprises guide rollers mounted in a carrier frame displaceable crosswise of the direction of travel of said pipe whereby said mandrel is displaced with said knife against the inside surface of said pipe which is supported by said thrust roller.

7. An apparatus according to claim 3 wherein said movable element comprises a circular casing tiltable about a hinge towards said cylinder whereby said knife is radially moved and guided by the inner edge of said cylinder.

8. An apparatus according to claim 7 wherein said circular casing adjustably carries an approach switch operable by said knife or a member attached thereto.

9. An apparatus according to claim 3 wherein said cylinder is a cylinder cam having a peripheral cam which is pitched and said apparatus further comprises means for revolving said cam at a rate so that the axial feed rate generated by said cam is equal to the linear speed of said pipe.

10. An apparatus according to claim 9 wherein the angular pitch of said cam corresponds to the angular pitch of the corrugation of said pipe.

11. An apparatus according to claim 3 wherein facing said rotating cylinder cam there is a roller to support said pipe.

12. An apparatus according to claim 1 wherein on both sides of said pipe there are guide rollers.

13. An apparatus according to claim 5 wherein at least one of said thrust rollers or counter rollers is provided with gear teeth and said pipe has external transverse corrugations engaged by said gear teeth.

14. An apparatus according to claim 13 wherein said apparatus further comprises means for driving the geared roller synchronously with a pipe forming machine producing the transversely corrugated pipe.

15. An apparatus according to claim 4 wherein the cutting apparatus comprising said mandrel and the cutting apparatus comprising said cylinder are connected to a pipe forming machine which provides pipe with transverse corrugations by a slotted drive shaft which slotted drive shaft is connected to a geared thrust roller disposed exteriorly of said mandrel and in engagement with the corrugations of said pipe, said slotted drive shaft also being in engagement with a driven roller to which via a transmission said cylinder is attached.

16. An apparatus according to claim 1 wherein the signal for initiating the cutting operation emanates from a signalling means on said forming machine.

* * * * *